Oct. 4, 1955 V. E. PRATT ET AL 2,719,714
SHEET CONVEYOR FOR MICROFILM APPARATUS
Filed May 2, 1951 6 Sheets-Sheet 1

INVENTOR.
VERNEUR E. PRATT
BY GEORGE F. GRAY

ATTORNEYS

Oct. 4, 1955 V. E. PRATT ET AL 2,719,714
SHEET CONVEYOR FOR MICROFILM APPARATUS
Filed May 2, 1951 6 Sheets-Sheet 2

INVENTOR.
VERNEUR E. PRATT
GEORGE F. GRAY
BY Van Deventer & Shively
ATTORNEYS

Oct. 4, 1955  V. E. PRATT ET AL  2,719,714
SHEET CONVEYOR FOR MICROFILM APPARATUS
Filed May 2, 1951  6 Sheets-Sheet 3
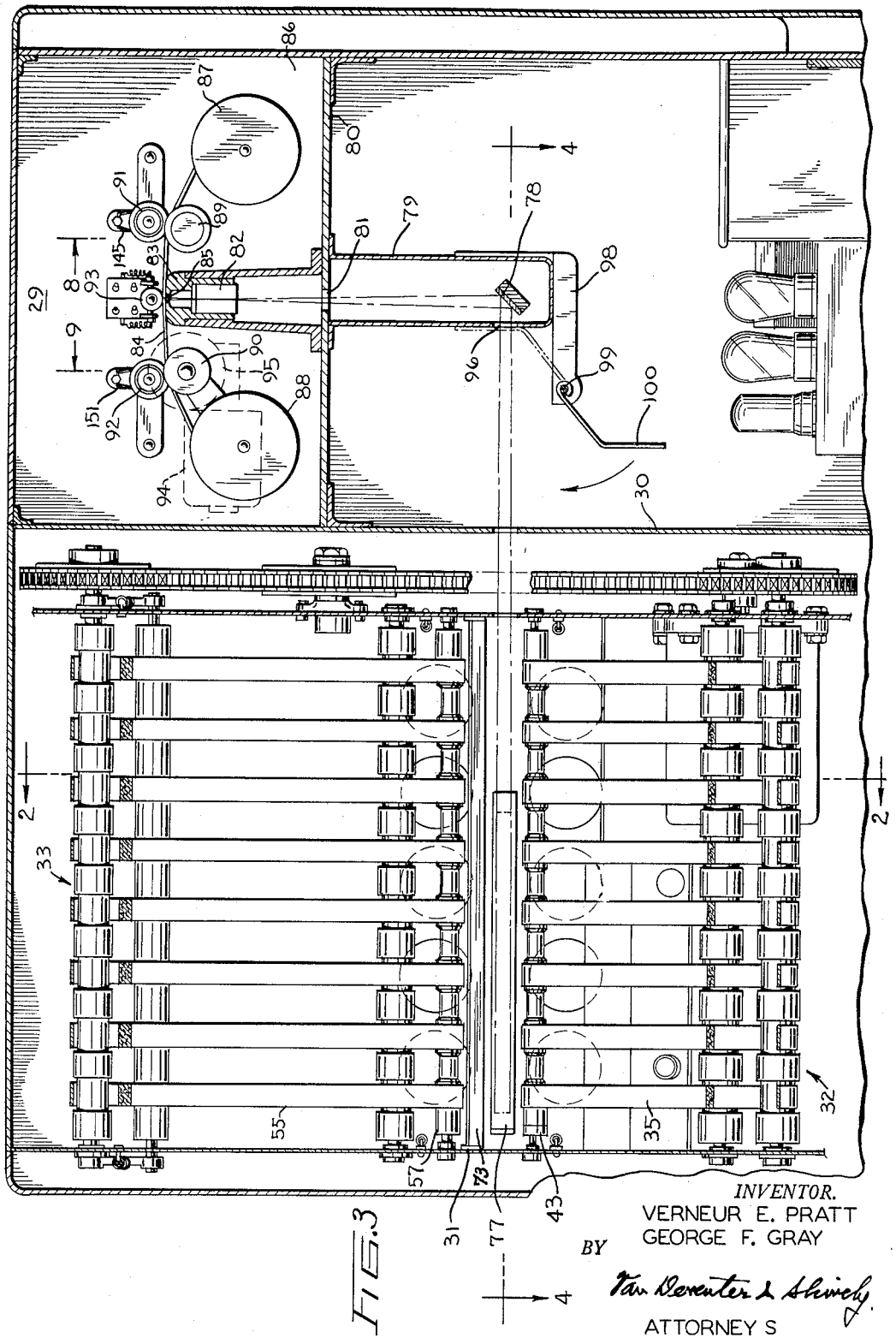
INVENTOR.
VERNEUR E. PRATT
GEORGE F. GRAY
BY
ATTORNEYS

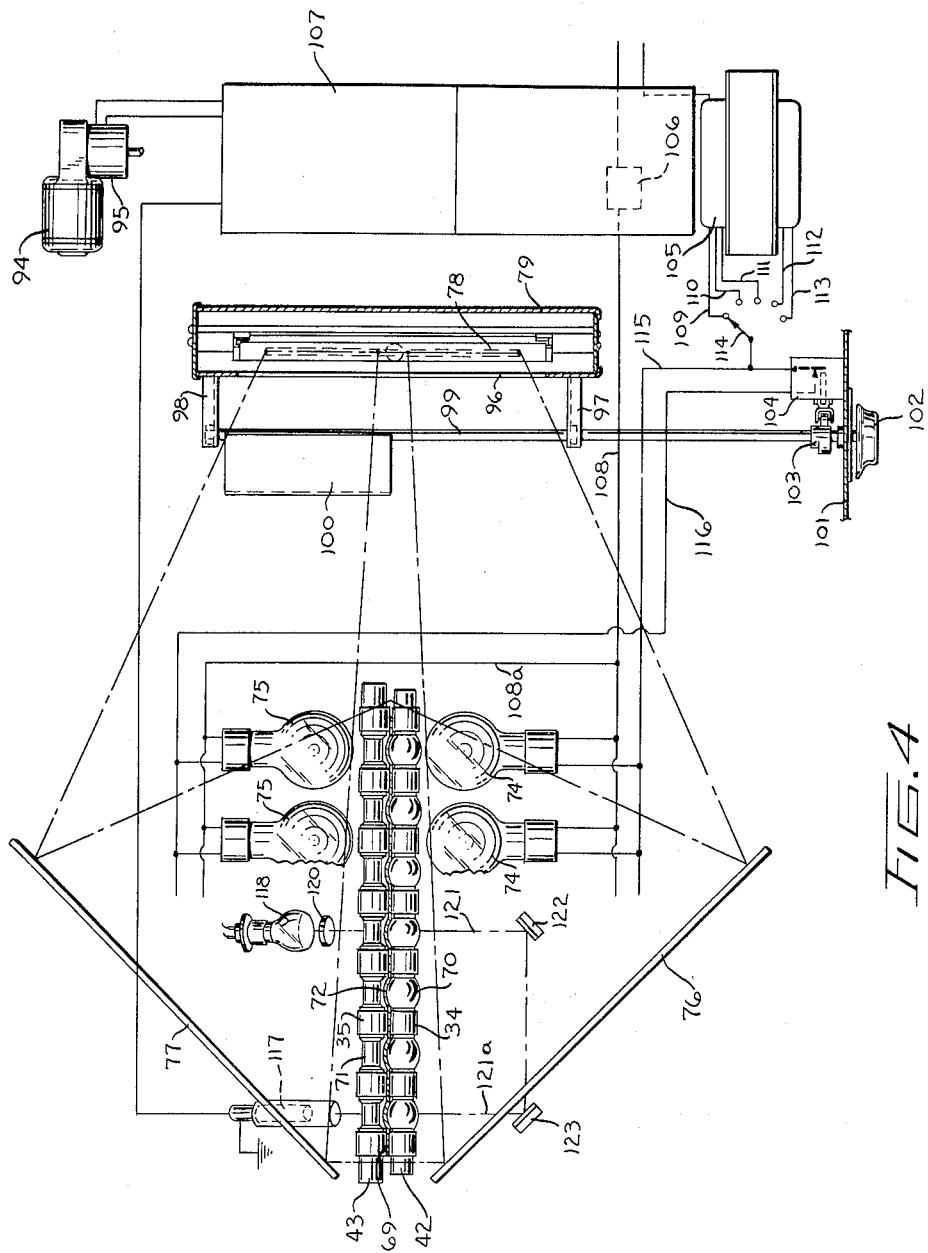

Oct. 4, 1955    V. E. PRATT ET AL    2,719,714
SHEET CONVEYOR FOR MICROFILM APPARATUS
Filed May 2, 1951    6 Sheets-Sheet 5

INVENTOR.
VERNEUR E. PRATT
GEORGE F. GRAY
BY
Von Deventer & Shively
ATTORNEYS

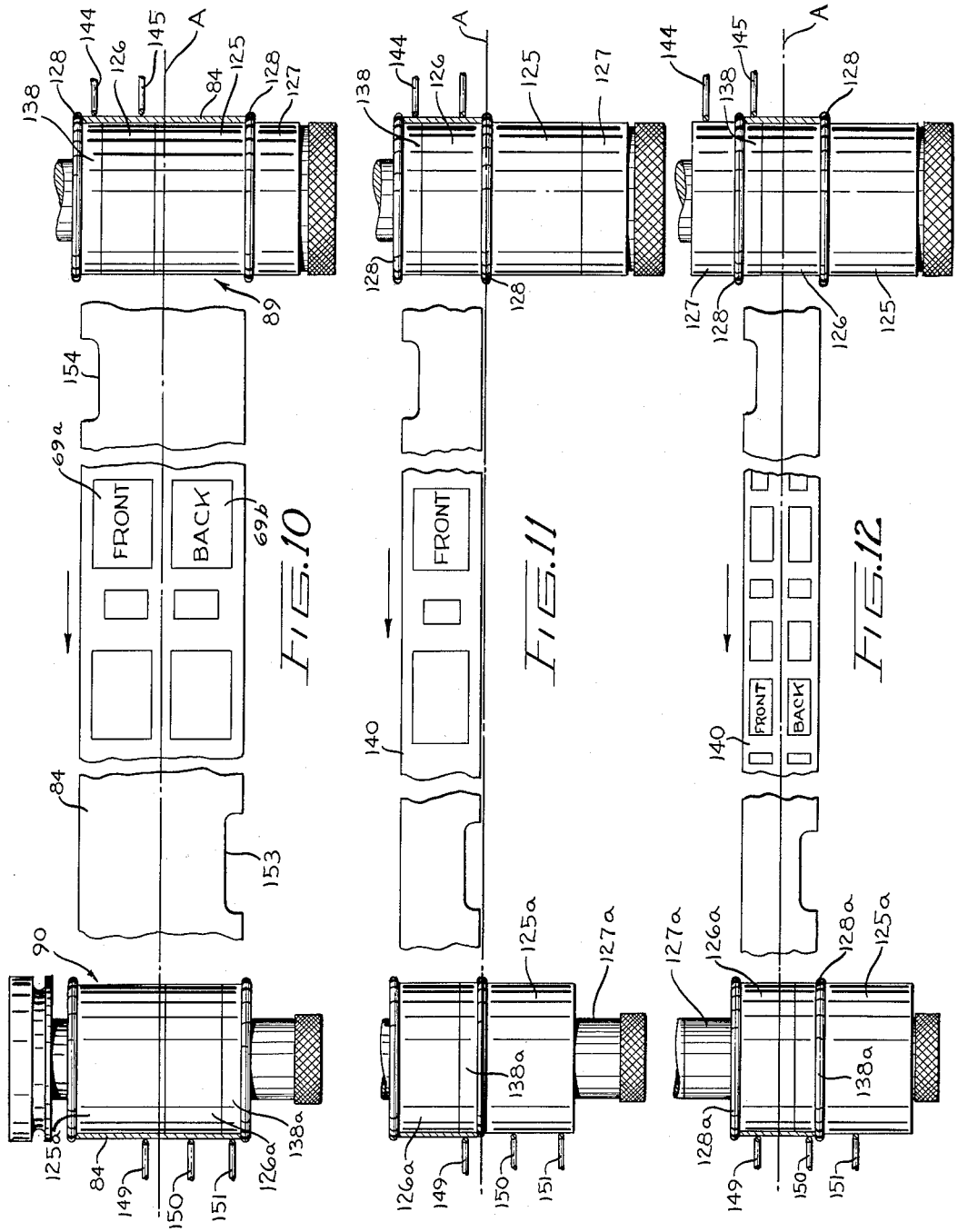

United States Patent Office 2,719,714
Patented Oct. 4, 1955

2,719,714

SHEET CONVEYOR FOR MICROFILM APPARATUS

Verneur E. Pratt and George F. Gray, Norwalk, Conn., assignors to Diebold, Incorporated, a corporation of Ohio Application May 2, 1951, Serial No. 224,196

5 Claims. (Cl. 271—45)

The present invention pertains to improvements in microfilm apparatus, being a continuation-in-part of our copending application Serial Number 62,942, filed on December 1, 1948 now Patent No. 2,606,478 dated August 12, 1952.

An object of the invention is to provide improved apparatus for microfilming checks, documents and the like while the latter are in rapid motion, that is in the manner known as the flow method.

A further object is to provide improved apparatus of the above nature quickly controllable at will to photograph one or both sides of the checks, documents and the like, either on wide or narrow film.

Another object is to provide a device of the above nature in which all photography takes place in an open zone unobstructed by guide members, glass platens or the like.

A further object is to provide improved conveying means adapted to move all types and conditions of documents through the device without difficulty due to previous crumpling, presence of paper clips, seals, and similar obstructions which have been sources of trouble in prior devices.

A further object is to provide means to impart longitudinal rigidity to the documents traversing the open focal zone, whereby flapping of the leading and trailing edges of the documents and consequent jamming and loss of focus are prevented.

Another object is to provide improved photo-electric control of the film drive, whereby the start and stop of the film are accurately controlled by the document's leading and trailing edges respectively, irrespective of whether the document is fed straight or not.

A still further object is to provide apparatus of the above nature in which documents are entered at a convenient low level and are returned outwardly from the extreme upper front of the machine at convenient eye-level for the operator, and in which all controls and film-changing apparatus are in easy reach of the operator seated at the feeding station.

Other objects and advantages will become evident during the course of the following description in connection with the acompanying drawings in which:

Figure 3 is a longitudinal sectional view generally in the plane 3—3, Figures 2 and 4;

Figure 4 is a horizontal partially diagrammatic sectional view generally in the plane 4—4, Figure 3;

Figure 10 is a semi-diagrammatic view illustrating the relationship of the two control rollers and the film as arranged for photography on wide film;

Figure 11 is a similar view showing the relationship of the roller sections and film for single-side photography on narrow film;

Figure 12 is a similar view showing the relation of the roller sections and film in two-sided photography on narrow film.

Figure 1:
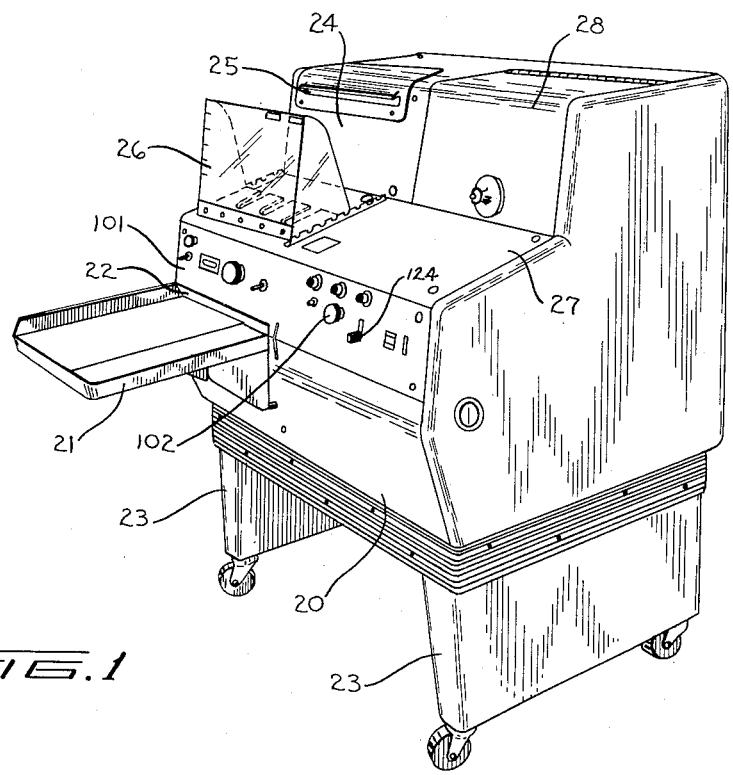
Figure 1 is a perspective exterior front and end view of a preferred form of the device.

Referring to Figure 1, the numeral 20 generally designates a flow-film camera body having secured to the left front portion thereof a table 21 in line with a feed slot 22, the body 20 preferably being mounted on legs 23 so as to bring the table 21 to convenient low level. The upper portion 24 of the body 20 is offset rearwardly, and is provided with a forwardly directed discharge slot 25 in its upper left portion. An adjustable rack 26, removably secured on the offset 27, is adapted to collect documents discharged through the slot 25. An upwardly hinged door 28 in the right upper portion of the body 20 forms a closure for a compartment 29, Figure 3, housing the film moving and lens structures as hereinafter set forth.

Figure 2:
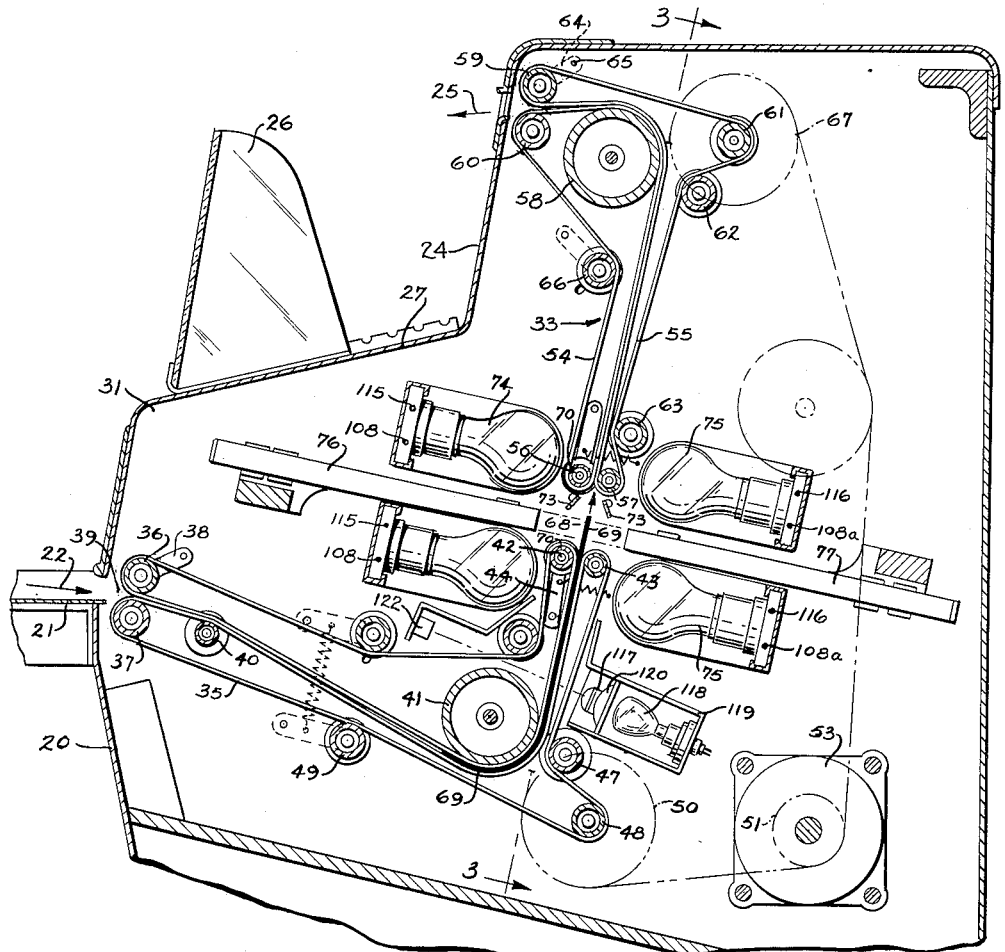
Figure 2 is a vertical cross sectional view in the plane 2—2, Figure 3, illustrating the conveying mechanism and related parts.

A pair of rigid plates 30 and 31, Figures 2 and 3, act as supports for the document conveyor, the latter comprising a first, or receiving section 32 and a second or discharge section 33. Referring to Figure 2, it will be seen that the receiving section 32 has two cooperative sets of endless tapes 34 and 35 disposed on upper and lower entering rollers 36 and 37 located directly behind the feed slot 22. The upper roller 36 is swung on pivoted arms 38 so as to normall press the tapes 34 and 35 together at the point of document inlet 39.

From the inlet station 39 the tapes 34 and 35 normally run together rearwardly over a single directing roller 40, thence around the bottom and rear of a drum 41, thence upwardly to a pair of front and rear delivery rollers 42 and 43. The roller 42 is swung on pivoted arms 44 and is spring-pressed rearwardly, thus pressing the tapes 34 and 35 resiliently together between it and the fixedly pivoted roller 43 to establish an outlet or delivery station for the receiving section 32 of the conveyor. From the roller 42 the tapes 34 return via a directing roller 45 and a spring-pressed tension roller 46 to the entering roller 36. The return sides of the tapes 35 extend around a directing roller 47, thence around a drive roller 48, thence via a spring-pressed tension roller 49 to the lower entering roller 37.

The drive roller 48 is revolved via sprockets 50 and 51 and a silent chain 52 by a geared synchronous motor 53.

The discharge section 33 also is provided with two sets of endless tapes 54 and 55, disposed on front and rear rollers 56 and 57, similar respectively to rollers 42 and 43, and overlying the latter in spaced relation as hereinafter set forth. The front roller 56 is spring pressed rearwardly, thus holding the tapes 54 and 55 normally pressed resiliently together between rollers 56 and 57 to form a receiving zone or station for the conveyor section 33. This receiving station is in direct alignment with the described delivery station of the receiving conveyor section 32, but is spaced upward therefrom as noted.

From the rollers 56 and 57 the tapes 54 and 55 pass upward together around a drum 58 and to a pair of final discharge rollers 59 and 60 disposed directly behind the discharge slot 25, Figures 1 and 2. From the upper discharge roller 59 the tapes 55 pass to and around a second drive roller 61, thence via a spring-pressed tensioning roller 62 and a guide roller 63 back to the receiving roller 57. The upper discharge roller 59 is swung on arms 64 pivoted at points 65 so located that the tension of the tapes 55 urges the roller 59 downward toward the fixedly located roller 60. It will be noted that the pivotal mounting of the entering roller 36 is similarly arranged, so that the tension of the tapes 34 urges the roller 36 downward toward the roller 37, as previously mentioned.

The tapes 54 are provided with a spring-pressed combined tensioning and guide roller 66, Figure 2, disposed below the drum 58.

The drive roller 61 is approximately 1½ per cent greater in diameter than the roller 48, and is provided with a drive sprocket 67 of the same size as sprocket 50. Sprocket 67 also carries the silent chain 52, Figures 2 and 3. It will be evident that when the chain 52 is actuated by the motor 53, the lower and upper tapes 35 and 55 are both moved, carrying with them their respective associated tapes 34 and 54, but the linear speed of the upper combination is slightly greater than that of the lower.

It has been previously set forth that the lower delivery rollers 42 and 43, together with their tapes 34 and 35, are aligned with the upper receiving rollers 56 and 57 and the latter's tapes; the two combinations are spaced apart to provide a gap between the delivery station of the lower conveyor section and the receiving station of the upper section. This gap includes a zone 68, hereinafter termed the photographic zone, free of any guides, platens or other obstructions to light.

When a document such as a sheet 69, Figure 2 is fed in at the slot 22, it is grasped between the tapes 34 and 35. These tapes convey the document 69 inward around the drum 41, then move it upward, thrusting the leading edge of the document upward through the photographic zone 68 and into engagement with the upper conveyor section tapes 54 and 55. The latter tapes grasp the document and continue its motion cooperatively with the lower tapes, finally conveying the document around the drum 58 and discharging it through the upper slot 25 into the tray 26. The very slightly greater speed of the upper conveyor section serves to keep the document taut in the photographic zone without causing noticeable speed-up of the trailing edge.

By the above-described operation the entire document 69 traverses the photographic zone 68 at substantially uniform speed. In order to insure proper alignment and location of the leading and trailing edges of the document as these edges traverse the unobstructed zone 68, the following provisions are made:

Referring to Figure 4, it will be seen that the lower delivery roller 42 is provided with a series of enlarged convex spools 70 disposed between the tapes 34. The spools 70 are so proportioned that their middle portions extend radially a small distance beyond the thickness of the tapes 34. The matching roller 43 is formed with reduced portions 71 between the tapes 35 and thus in alignment with the spools 70.

Figure 5:
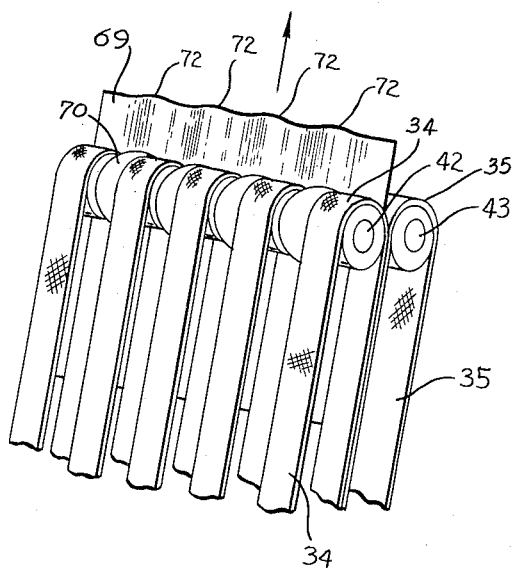
Figure 5 is a perspective fragmental view illustrating the effect of the forming rolls in producing longitudinal stiffening corrugations, the depth of the corrugations being exaggerated for purposes of clear illustrations.

As the document 69, held between the tapes 34 and 35, passes between the rollers 42 and 43 it is engaged by the spools 70 which form shallow corrugations 72 therein as shown in Figures 2, 4 and 5. These corrugations act as stiffeners which impart rigidity to the document in the direction of its travel, so that the leading edge thereof emerges as best seen in Figure 5.

The stiffness thus imparted to the sheet 69 holds the latter accurately in the plane of the adjacent lower and upper conveyor sections as the leading edge moves from one to the other through the photographic zone 68.

The upper or receiving rollers 56 and 57 have structures and relationship identical with those of the lower rollers 42 and 43 as described. Therefore, as the leading edge of the document enters the upper conveyor section the spools 70 of the roller 56 engage and maintain the corrugations 72. This provision assures that the trailing edge of the document is also stiffened to keep it accurately in the proper plane during its passage through the photographic zone 68 in the same manner as the leading edge.

It will be understood that for purposes of clarity in illustration the depth of the corrugations 72 has necessarily been exaggerated, particularly in Figure 5. In practice the depth of corrugations necessary to produce the described stiffening effect is sufficiently small as to fall well within the depth of focus of the photographic lens employed, to produce no detectible distortion in photographs of the document and to prevent any wrinkles which might photograph as shadows. The stiffening effect, however, is so positive that all types of documents, checks and the like, no matter what their prior condition of creasing or even crumpling, are effectively straightened and held properly aligned from leading to trailing edge during their passage through the photographic zone 68. By the means described both sides of the documents are equally and properly presented directly for photography as hereinafter described, without the interposition of platens, glass pressure plates or similar cumbersome obstructions.

The absence of such guide means has the further advantage of permitting the free passage of documents carrying protruding elements such as paper clips, seals, flaps, torn corners, etc., which in prior devices have caused tangling in the guide or flattening means. To insure proper entry of widely protruding elements into the upper conveyor section 33, two narrow transparent plates 73 are angularly disposed above the photographic zone 68 to form a tapering throat below the rollers 56 and 57, as shown in Figure 2.

A double bank 74 of incandescent lamps is adapted to illuminate the one side of the document 69 in the zone 68, while a similar rear double bank 75 furnishes illumination to the other side. The fact that the throat plates 73 are transparent prevents the latter from interfering with full illumination from the upper lamps of banks 74 and 75.

A pair of mirrors 76 and 77, Figures 2, 3 and 4, are angularly disposed in line with the photographic zone 68 so as to reflect images of the back and front of the document 69 to a third mirror 78, the latter being housed in a box 79 secured to the bottom of a substantially horizontal partition 80 forming the bottom of the camera-head compartment 29. The mirror 78 is inclined at an angle of 45° to reflect the aforesaid images upward through a slot 81 in the partition 80 to a lens 82. The lens 82 is secured in a removable combination lens mounting and film guide 83 of the type generally shown and claimed in our Patent Number 2,538,269, issued January 16, 1951, and further shown in improved form in our co-pending application Serial Number 62,942, filed December 1, 1948. The lens 82 brings the image automatically to focus on a film 84 via a slit 85 in the upper portion of the guide 83, Figure 3.

A panel 86 of suitable rigid material serves as a mounting plate for film reels 87 and 88, a drag roller 89 and a drive roller 90. The film 84 is threaded from the reel 87 over the drag or tension roller 89, thence over the guide 83 and the drive roller 90 to the receiving reel 88. Pressure rollers 91 and 92 press the film 84 into firm engagement with the tension and drive rollers 89 and 90 respectively, and a small hinged roller 93 insures accurate engagement of the film across the slit 85 in the guide 83.

The drive roller 90 is adapted to be operated by a geared synchronous motor 94 via a magnetic clutch 95 in the manner fully set forth in the above-mentioned copending application Serial Number 62,942, so as to move the film 84 across the slit 85 at a speed less than that of the document 89 in exact proportion to the optical reduction ratio provided by the lens 82. However, while the action of the tension, drive and pressure rollers in controlling the film is in general the same as described in the noted co-pending application, the present invention includes novel and useful structural improvements in these parts which cooperate in rendering the machine a duplex type, as hereinafter described in connection with Figures 8 to 13.

Referring to Figures 3 and 4, the numeral 96 designates a slot in the box 79 through which the images from the mirrors 77 and 78 are reflected to the inclined mirror 78. A pair of brackets 97 and 98, secured to the bottom of the box 79, rotatably support a hinge-rod 99 on which is fastened an angular flap or shutter 100. The rod 99 extends through the front panel 101 of the machine, and is provided with an exterior knob 102, Figures 1 and 4. The flap 100 when in position for two sided photography, extends downward clear of the slot 96, as shown in full lines in Figure 3, but may be swung upward by means of the knob 102 to the position shown in dot-and-dash lines, in which position the shutter closes up the rear half of the slot 96, thus cutting off any reflection threthrough from the rear mirror 77, Figure 4.

The rod 99 also carries a cam 103, Figure 4, adapted to actuate a switch 104 so that the latter is closed when the shutter 100 is open and open when the shutter is closed.

The lamp banks 74, and 75 are adapted to receive current on one side via an auto-transformer 105 and on the other via a relay 106 in the general manner fully set forth in the previously mentioned co-pending application Serial Number 62,942, which latter also sets forth in detail the electronic control means 107 by which the relay 106 as well as the clutch 95 are actuated. Therefore, since the internal details, delay circuits and other inter-relations within the electronic control unit and relay combination are fully set forth in the prior application as noted, and since these details do not comprise per se a specific part of the present invention, further description thereof is unnecessary except as regards their external connections in the present invention.

Referring to Figure 4, the supply conductor 108 from the relay 106 is connected directly or via a branch 108a to all lamps, both upper and lower, of both banks 74 and 75. The auto-transformer 105 has 5 taps 109, 110, 111, 112 and 113 leading to a selector switch 114 operable to selectively supply different voltages to the lamps for varying the intensity of the light furnished thereby. The selector switch 14 is connected directly through a conductor 115 with all the lamps of the bank 74, but the lamps of the rear bank 75 have their second supply connection via a common conductor 116 and the switch 104, to the conductor 115 and selector switch 114.

From the above description it will be evident that in the position shown, that is with the switch 104 closed, when the relay 106 is closed all lamps of both banks are energized. However, when the knob 103 is turned to close the shutter 100 as described, the cam 103 opens the switch 104, so that closure of the relay 106 furnishes current only to the lamps of the bank 74, the rear bank 75 remaining unlighted.

Referring to Figures 2, 3 and 4, the numerals 117 and 118, respectively, designate a photocell and a small projection lamp mounted in spaced relation in a housing 119, Figure 2.

The lamp 118, provided with a lens 120, is adapted to project a beam of light along a path 121 between two adjacent pairs of the tapes 34 and 35 to a small angularly disposed mirror which deflects the beam laterally to a second small angular mirror 123, Figure 4. The second mirror 123 in turn deflects the beam back along a path 121a between second pairs of tapes 35 and 36 to the photocell 117. Thus the beam normally passes through the document lower conveyor section 32 twice in paths spaced from each other as shown in Figure 4, the plane of the paths being above the drum 41 as shown in Figure 2.

The cell 117 is electrically connected to the electronic control unit 107 to trip the latter in a well-known manner when the light beam is intercepted, the control unit thereupon functioning as described in the above-noted copending application to close the relay 106 and also to engage the magnetic clutch 95.

The operation of the device for two-sided photography on wide film, for example 35-millimeter film, is as follows:

Current is directed to the conveyor motor 53, the camera motor 94, the electronic control unit 107 and lamp 118 by means of a switch 124, Figure 1.

Referring to Figure 2, the document 69, fed in through the slot 22, is grasped by the receiving conveyor section 32 and carried inward and upward as previously described. As the leading edge of the document passes upward it interrupts the light path 121, the path 121a, or both, any one of these interruptions cutting off the light to the photocell 117 and thereby tripping the electronic control unit 107. The latter closes the relay 106 to turn on all the lamps of banks 74, 75, and after an appropriate time delay as described in the above-noted co-pending application, causes the clutch 95 to engage and start the film 84.

The document moves upward through the zone 68, stiffened by the action of the forming rollers 56 and 42 as previously described. The lamp banks 74 and 75 illuminate both sides of the document in the zone 68, causing images thereof to be reflected from the mirrors 76 and 77 to the inclined mirror 78, thence upward through the lens 82 to the film 84. As the speeds of the document and the film are in the same proportion as the reduction of the lens 82, unblurred images 69a and 69b of the document 69 are impressed or flow-photographed side by side on the film as illustrated in Figure 10. Due to the rigid retention of the document in the focal plane provided by the forming rollers 42, 43 as noted, the entire document is accurately photographed from leading to trailing edge, and the lack of any guides, glass platens or the like in the zone 68 insure uniformity and freedom from distortion in both images.

Restoration of the light beam between the lamp 118 and photo-cell 117 as the trailing edge of the document passes upward again activates the electronic control 107, which after a second appropriate time delay sufficient to allow the trailing edge to clear the photographic zone 68, opens the lamp relay 106 and disengages the clutch 95.

Figures 6, 7:
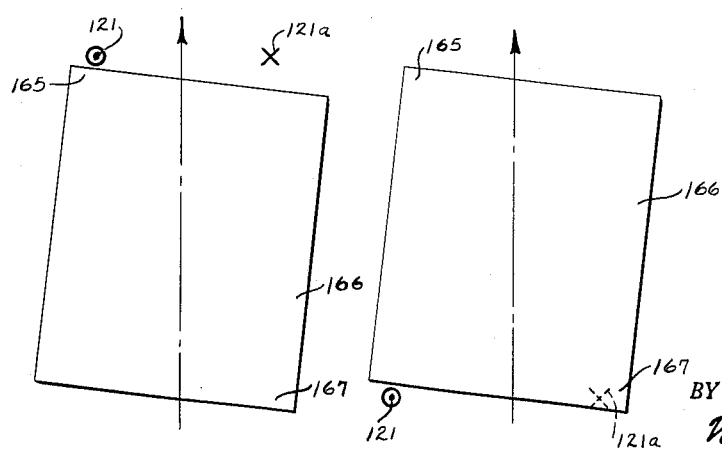
Figure 6 is a diagrammatic view illustrating the photo-electric control of starting the film by the leading edge of a document fed crookedly.
Figure 7 is a similar view illustrating the control of stropping the film by the trailing edge of the same document.
Figure 8:
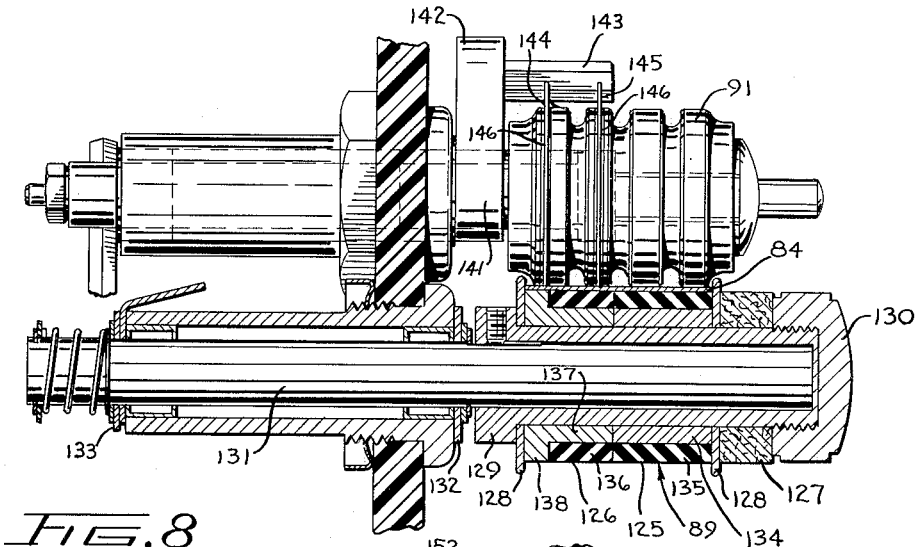
Figure 8 is a longitudinal view partly in section of the sectional film drag roller and its accompanying pressure roller arranged for two-sided photography on wide film.

Figures 7 and 8 illustrate how the provision of the two paths 121 and 121a for the light-beam from the lamp 118 to the photo-cell 117 prevents omission from the picture of either the leading or trailing corner of a small document in case the latter is fed crookedly.

Large copy, occupying the full width of the feed table 21 and slot 22, cannot readily be fed in improper position, but in the case of smaller documents such as bills and the like hurried or careless action by the operator may occasionally cause crooked feeding. In such case, if only a single light path were provided, for example path 121, Figure 7, it is evident that if the forward-most leading corner 165 of the document 166 intercepted the path 121, photography would begin in proper time to include the forward corner 165, but the light-beam would be restored and the exposure stopped too soon to include the rearmost trailing corner 167. Similarly if the document were canted the other way the rearmost trailing corner would be included but the forward-most leading corner would be omitted.

By the present double-path light beam arrangement, it is evident that intercepting either path 121 or 121a serves to start photography, but that both paths must be cleared in order to stop the photographic process. Thus, whichever leading corner of the document is forward-most initiates photography, and whichever trailing corner is rearmost terminates it, preventing any omission of either corner from the photograph.

If it is desired to photograph only one side of a document or series of documents on wide film, the operator revolves the knob 102 to close the shutter 100 and open the switch 104. By this means the lamps of the rear bank 75 are disabled and the rear half of the slot 96 is blocked off, so that as copy is fed through the machine the film 84 receives a series of front images along its rear half. When the rear half of the film is filled, the reels 87 and 88 may be interchanged and a second row of single-side images impressed on the remaining width of the film. If it is desired to separate the two series of the film of course may be slit lengthwise after development.

It will have been noted that the foregoing change from two-side to single-side operation is accomplished merely by the turning of a knob, and without any shifting of the camera position, thereby maintaining high rigidity of mounting and accuracy in relation of the optical elements with consequent uniformly high quality of micro-filming.

In single-side photography as described, the disabling of the lamps 75, in addition to saving current, also assures uniformly sharp front photography by avoidance of any rear-to-front light transmission through transparent or translucent sheets such as tracings, thin letter copies or the like. At the same time the shutter 100 prevents any possibility of photographing a rear image by light transmitted through such sheets from the lamps 74.

In addition to providing optional two-side or single side photography, the device is so constructed as to permit single side photography on narrow film, for example 16-millimeter, utilizing the entire width of the film in a single series of images, and is further adapted to two-side photography on narrow film. The means by which this adaptability is obtained in as follows:

Referring to Figure 8, the sub-assembly of the drag-roller 89 comprises a wide collar 125, a narrow collar 126, a spacer 127 and two flanges 128, all stacked on a sleeve 129 and removably secured thereon by a knurled screw cap 130. The sleeve 129 is secured on a rotary spindle 131 provided with spring-pressed friction thrust washers 132 and 133 adapted to create a drag against rotation of the roller 89.

The wide collar 125 comprises a metallic inner sleeve 134 covered by an insulating shell 135 of frictional material such as synthetic rubber. The narrow collar 126 has a similar insulating and driving shell 136, but its metallic inner sleeve 137 is flanged at one end to form a conducting ring 138 forming part of the roller's film-engaging surface. The width of the narrow collar 126 is substantially the same as the narrow film to be used, while the combined width of the collars 125 and 126 is substantially the same as that of the wide film 84. Thus when the collars, spacer and flanges are stacked as shown in Figure 8, the assembly forms a flanged roller fitting the wide film 84 and centering the latter with a line A, Figure 10, comprising the transverse center-line of the lens system. In this arrangement the collar 126 is so arranged that the conducting ring 138 is located next to the flange 128 at the inner end of the roller 89, for reasons hereinafter set forth.

Figure 9:
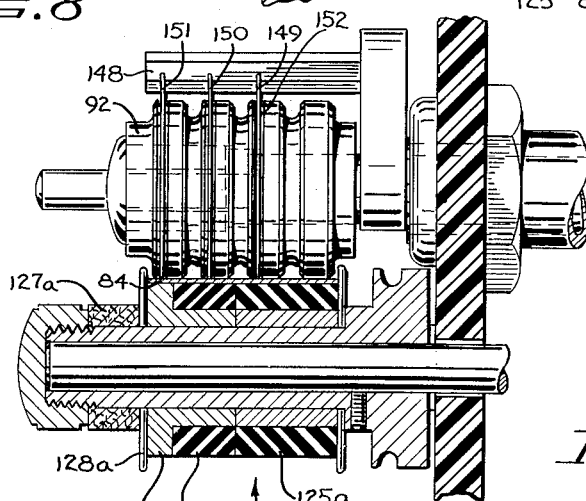
Figure 9 is a similar view of the drive-roller and its pressure-roller.

Referring to Figure 9, it will be seen that the drive roller 90 is also built up of a set of wide and narrow collars 125a and 126a, spacer 127a and flanges similar to those already described. However, in the case of the drive roller 90 the narrow collar 126a is comprised of the outer or front portion of the contact surface and is turned to locate its conducting ring 138a next the flange 128a at the front end of the roller.

When it is desired to conduct single-side photography only on narrow film, the knurled caps 130 and 130a are removed and the components of the rollers rearranged as shown in Figure 11. Thus the front flange 128 is interposed between the collars 125 and 126 of the roller 89, while the collars 125a and 126a of the drive roller 90 are interchanged and the outer flange 128a is placed between them. With these arrangements, as shown in Figure 11, the narrow film 140 is located rearwardly of the centerline A of the lens system, and is consequently adapted to receive full width images from the front of the document 69.

In the case of two-side photography on narrow film the roller parts are arranged as just described, except that the spacers 127 and 127a are placed at the rear or inner ends of the roller assemblies as shown in Figure 12. The width of the spacers is such that with this combination the collars 126 and 126a center the film 140 on the centerline A of the lens system, allowing either two-side or one-side photography on the narrow film 140 in the same manner as previously described for the wide film 84.

In two-side photographing of documents such as checks, cards and the like having widths not more than half that of the conveyor, the same reduction as for wide film may be used with the narrow film, the documents being fed in the normal manner through the left side of the feed slot 22. If two-side photography of full width documents is to be made on the narrow film 140, the detachable lens mount 83, carrying the lens 82, is removed in the manner described in co-pending application No. 62,942 and replaced with a similar combination including a lens 82 pre-focussed to attain the required greater reduction. To provide the necessary reduced speed of the film, a set of drive roller components of reduced diameter, comprising equipment of the machine associated with the corresponding lens, is assembled in the manner described to form the drive roller 90.

Figure 13:
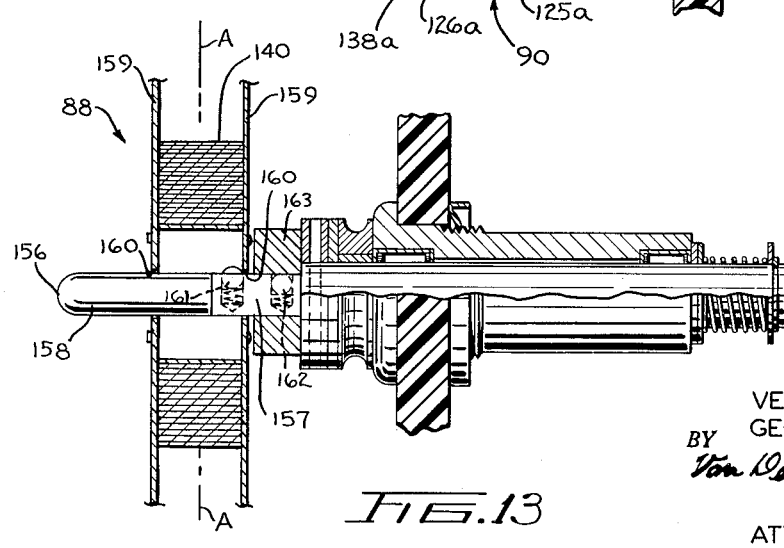
Figure 13 shows one of the film-reel spindles.

To assure easy and accurate alignment of the film reels 87 and 88 on their spindles 155 and 156, Figure 2, with any of the above-described positions of the roller components, provision is made as illustrated in Figure 13, the structure of spindle 156 therein being typical of both spindles. The spindle has a square rear driving portion 157, the front or pilot portion 158 being formed cylindrically with a diameter equal to the square dimension of portion 157. The side plates 159 of the reel 88 are provided with square holes 160, either of which is adapted to fit the square portion 157 while the other is centered by the pilot 158.

Outer and inner spring-pressed ball latches 161 and 162 are disposed in the square driving portion 157. When it is desired to center a narrow film 140 as in Figure 12, a suitable spacer 163 is placed on the driving portion 157 against the driving flange 164 of the spindle. When the reel 88 is shoved on the spindle the inner side plate 159 over-rides the outer ball latch 161, which latter then springs outward as shown, to lock the reel in centered position against the spacer 163 as shown. When a narrow film 140 is to be offset as in Figure 11, or when a wide film 84 is to be centered as in Figure 10, the spacer 163 is removed, and when the reel is pushed into place it is latched in proper position against the flange 164 by the inner latch 161.

The above-noted co-pending application sets forth switching means associated with the drag and drive rollers of the camera, by which electrical contact with the rollers through appropriate notches in the edges of the film operate via the electronic control to disengage the clutch. The purpose of this arrangement is automatically to stop the film when the outer layers or daylight loading "safety wrap" has been unwound from a newly loaded reel of film, and similarly to stop the device as the end of the film approaches. The present device operates in substantially the same manner, but includes improved switching means associated with the rollers 89 and 90, as shown in Figures 2, 8 and 9.

Referring to Figures 2 and 8, the spring-pressed arm 141 which carries the pressure roller 91 has an upward extension 142 to which is attached a short post 143 overhanging the roller 91. Two light wire contact springs 144 and 145, secured at the top in the post 143 in spaced relation, extend downward in grooves 146 in the roller 91 and normally press lightly against the outer surface of the film 84. Similarly, referring to Figures 2 and 9, the arm 147 carrying the roller 92 is provided with a post 148 overhanging the entire width of the roller and having three spaced light wire contact springs 149, 150 and 151 riding in grooves 152 and also normally pressing against the film 84.

The functions of the described contact springs is best illustrated in Figures 10, 11 and 12.

Referring to Figure 10, it will be noted that the spring 151 overlies the contact ring 138a of the drive roller 90, but is normally held out of contact therewith by the insulating film 84. Similarly, the spring 144 overlies the contact ring 138 of the drag roller 89. When the "safety wrap" or leading portion of the film 84 has been unwound and the first notch 153 under-rides the spring 151, the latter springs into contact with the ring 138a thus completing an electrical connection to stop the film as set forth in the previously noted co-pending application.

Similarly, after the operator has re-started the apparatus for photography, and as the trailing end portion or wrap of the film reaches the drag roller 89, the second notch 154 allows the spring 144 to engage the contact ring, completing a connection to stop the film and warn the operator that the main portion of the film is exhausted. The operator thereupon stops feeding copy and re-starts the apparatus to complete the trailing safety wrap for daylight unloading.

In the arrangement of the roller components shown in Figure 11 the spring 144 performs the same function as in Figure 10, but the stopping contact with the ring 138a is performed by the spring 149 instead of spring 151. Similarly, in the arrangement shown in Figure 12 the drag roller contact is made by the spring 145 while the drive roller contact is provided by the spring 150. Thus it will be seen that the number and spacing of the various contact springs is such as to provide the above-described automatic stopping functions in all the noted arrangements of film control rollers without any alteration or adjustment.

From the foregoing description throughout it will be evident that the present invention provides a duplex microfilming device of great flexibility, adapted to single or two-side photography on wide or narrow film at will and changeable from any one type of operation to any other with maximum ease and precision. All controls, as shown in Figure 1, as well as the camera parts, are in easy reach of an operator seated at the desk-level feed table 21. The two-section conveyor combination as described, in addition to the noted advantages of accepting all types and conditions of documents and conveying them in rigid alignment through the unobstructed photographic zone, also provides delivery from the extreme top of the machine at convenient eye-level for the operator.

While the invention has been described in preferred form, it is not limited to the precise structures illustrated, as various changes and modifications can be made without departing from the scope of the appended claims.

What is claimed is:

1. In a flow camera, in combination, a casing having a feed slot and a discharge slot for documents, a conveyor section for said documents in said casing having an inlet station adjacent said feed slot and a delivery station, a second conveyor section having a discharge station adjacent said discharge slot and a receiving station aligned with said delivery station of said first section but spaced therefrom, whereby an unobstructed photographic zone is established for both sides of said documents passing from said first conveyor section to said second conveyor section, means to drive said sections, means on said first conveyor section to establish shallow longitudinal corrugations in said documents passing through said zone, and means on said second conveyor section to maintain said corrugations.

2. In a flow camera having a photographic zone for documents said zone being wholly unobstructed on both sides of a plane across said zone; in combination, a conveyor section adapted to push said documents across said zone substantially in said plane; means on said conveyor section to establish rigidity in said documents moving from said conveyor section across said zone whereby said documents may be self-guiding in said zone; a second conveyor section spaced across said zone from said first conveyor section and adapted to receive said documents, means on said second conveyor section to maintain said rigidity in said documents, and means to drive both said sections, the linear conveying speed of said second section being slightly greater than the linear conveying speed of said first section.

3. In a flow camera, in combination, a first conveyor section including a pair of receiving rollers and a pair of discharge rollers, a set of spaced endless tapes extending between and embracing one of said receiving rollers and one of said discharge rollers, a second set of spaced endless tapes extending between and embracing said other receiving roller and said other discharge roller in alignment with said first tapes, means urging said receiving rollers toward each other and said discharge rollers toward each other whereby said sets of tapes may grasp and convey documents inserted between said receiving rollers, a second conveyor section including a second pair of receiving rollers aligned with said first pair of discharge rollers to receive said documents from said first section, said second pair of receiving rollers being spaced from said discharge rollers to establish an unobstructed photographic zone between said sections, means on one of said discharge rollers to establish shallow longitudinal corrugations in said documents traversing said zone, and means to drive said two conveyor sections, the linear conveying speed of said second section being slightly greater than that of said first section.

4. The combination claimed in claim 3 wherein said second pair of receiving rollers is disposed above said discharge rollers, and wherein said second conveyor section includes means to eject said documents substantially horizontally at a level substantially above the level of said first pair of receiving rollers.

5. The combination claimed in claim 3 wherein said first conveyor section is disposed to receive said documents substantially horizontally, and including a guide drum for said tapes intermediate said first pair of receiving rollers and said discharge rollers and adapted to direct said tapes upward to said discharge rollers, said second pair of receiving rollers being disposed above said discharge rollers, and wherein said second conveyor section includes means to eject said documents substantially horizontally at a level substantially above the level of said first receiving rollers.

References Cited in the file of this patent

UNITED STATES PATENTS

| Number | Name | Date |
| --- | --- | --- |
| 275,606 | Demain | Apr. 10, 1883 |
| 1,344,896 | Jobke | June 29, 1920 |
| 1,941,484 | Nasmith | Jan. 2, 1934 |
| 1,993,178 | Mitchell | Mar. 5, 1935 |
| 2,034,441 | Petit | Mar. 17, 1936 |
| 2,052,310 | Lifsitz | Aug. 25, 1936 |
| 2,153,154 | Nivison | Apr. 4, 1939 |
| 2,177,135 | Fassel | Oct. 24, 1939 |
| 2,186,986 | Nelson | Jan. 16, 1940 |
| 2,291,006 | Stuart | July 28, 1942 |
| 2,292,825 | Dilks | Aug. 11, 1942 |
| 2,410,611 | Pratt | Nov. 5, 1946 |